United States Patent [19]

Toshida et al.

[11] 3,731,772
[45] May 8, 1973

[54] DISC BRAKE FOR MOTOR VEHICLES
[75] Inventors: Shunichi Toshida; Takashi Ozora, both of Tokyo, Japan
[73] Assignee: Nissan Motor Company, Limited, Yokohama, Japan
[22] Filed: Apr. 13, 1971
[21] Appl. No.: 133,543

[52] U.S. Cl............188/345, 60/54.6 M, 188/72.5, 188/370
[51] Int. Cl..............................................B60t 11/20
[58] Field of Search.................188/72.5, 345, 370, 188/106 P; 60/54.6 M, 54.6 E

[56] References Cited

UNITED STATES PATENTS

| | | | |
|---|---|---|---|
| 3,520,385 | 7/1970 | Huffman et al. | 188/345 |
| 3,490,565 | 1/1970 | Marschall et al. | 188/345 |
| 3,268,038 | 8/1966 | Bauman | 60/54.6 M X |
| 3,375,906 | 4/1968 | Hayes | 188/73.3 |
| 3,465,852 | 9/1969 | Belart | 188/345 |
| 3,477,549 | 11/1969 | Barton | 188/345 |

FOREIGN PATENTS OR APPLICATIONS

| | | | |
|---|---|---|---|
| 2,028,415 | 11/1970 | Germany | 188/72.5 |

Primary Examiner—George E. A. Halvosa
Attorney—McCarthy, Depaoli, O'Brien & Price

[57] ABSTRACT

A disc brake for an automotive hydraulic brake system having main and auxiliary brake lines, which disc brake includes a rotatable braking disc, a pair of friction pads positioned on either side of the braking disc, main and auxiliary fluid chambers into which fluid under pressure is introduced through the brake lines for moving the friction pads to positions to grip the braking disc and a yoke moved by means of the pressurized fluid to move one of the friction pads into its braking position, the main and auxiliary fluid chambers being isolated by two spaced sealing rings and a drain passage being provided which originates from between the two sealing rings whereby, in case one of the sealing rings fails during operation, the braking action is satisfactorily initiated and the leakage of the fluid through the drain passage and the decrease in the level of the fluid in the cylinder reservoir provides a visual indication of the failure of the sealing ring to the driver of the motor vehicle from observation of a decrease in the fluid pressure in the master cylinder. Arrangements are further made to free the yoke from a braking torque which is otherwise imparted thereto from the friction pads during braking operation.

8 Claims, 4 Drawing Figures

INVENTOR
Shunichi Toshida and Takashi Ozora
BY
McCarthy, Depaoli, O'Brien & Price
ATTORNEYS

DISC BRAKE FOR MOTOR VEHICLES

This invention relates to a hydraulic brake system for a motor vehicle and, more particularly, to a disc brake which is used in an automotive hydraulic brake system having an auxiliary brake line.

Some motor vehicles have a hydraulic brake system which is equipped with an auxiliary brake line in addition to a main line for safety purposes. In the event the main brake line happens to fail during operations, the auxiliary brake line still functions to apply the brakes to bring the motor vehicle to a stop. Such auxiliary brake line is usually provided in association with the front-wheel brakes because a failure taking place in the front-wheel brakes invites a much more serious accident than that occurring in the rear-wheel brakes. The disc brake according to this invention is specifically intended for use in the brake system of this character.

The disc brake to which this invention is directed uses a rotatable braking disc and a pair of friction elements called the brake pads. The brake pads are located on either side of the braking disc and, when the brake is to be applied, the brake pads are forced against the braking disc by means of a fluid under pressure passed from a master cylinder through the hydraulic brake line. The disc brake is provided with main and auxiliary fluid chambers which are led respectively from the main and auxiliary hydraulic brake lines so that the two brake pads are normally moved to their braking positions by the fluid pressures carried into the fluid chambers. These fluid chambers are isolated from each other by sealing means. In this instance, the brake pads are permitted to operate in a sound state even when the sealing means is destroyed or worn out during use, so far as the remaining seals remain intact. It is thus practically impossible to have a failure of the sealing means detected at the appropriate time unless the other seals have been found damaged.

If, furthermore, the seals associated with at least one of the main and auxiliary brake lines happen to fail while the sealing means isolating the two fluid chambers are damaged, then the fluid pressure will be released from the brake lines with the result that the brakes can not function satisfactorily.

It is therefore an important object of this invention to provide a disc brake which is freed of such difficulty by means of simple and economical construction arrangements.

More specifically, the object of this invention is to provide an improved disc brake which is operable in satisfactory conditions even when a failure is involved in one of the two brake lines and in which a failure of sealing means in the disc brake can be detected at the appropriate time.

To achive this object, two separate sealing rings are used to isolate the main and auxiliary fluid chamber from each other and a drain passage is provided between the two sealing means. With this arrangement, when one of the sealing rings is damaged during operations of the motor vehicle, the two chambers are still isolated from each other by means of the remaining sealing ring and, at the same time, the pressurized fluid drawn into the fluid chamber associated with the damaged sealing ring is released out of the fluid chamber through the drain passage to inform the operator of the presence of the failure of the sealing ring through visual indication of a decrease in the fluid level in the master cylinder. The damaged sealing rings can thus be replaced with a new one at the appropriate time so as to enable the brake to operate at all times in satisfactory conditions.

Improvements are further incorporated in the disc brake according to this invention so as to provide a simplified construction and a streamlined operation of the disc brake. Such additional improvements will become apparent as the description proceeds.

Figure 1:
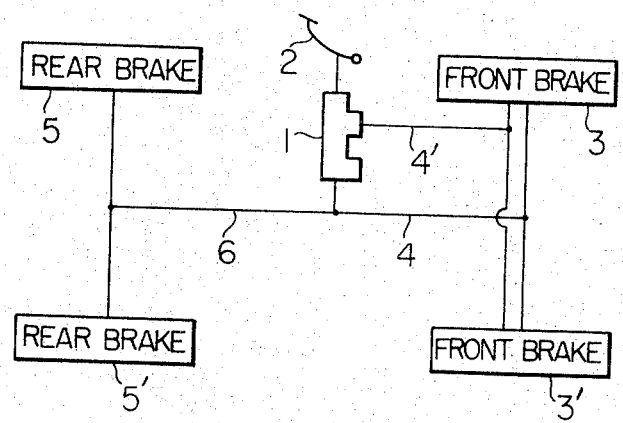
FIG. 1 is a diagrammatic view showing an overall construction arrangement of an automotive hydraulic brake system incorporating this invention.

Reference is now made to the drawings and particularly to FIG. 1. The hydraulic brake system as shown includes a fluid motor or master cylinder 1 which is operated by a brake pedal 2 so as to deliver fluid under pressure. The master cylinder 1 is connected to front-wheel brakes 3 and 3' through main and auxiliary front brake lines 4 and 4', respectively, and to rear-wheel brakes 5 and 5' through a rear brake line 6. The auxiliary brake line 4' may be connected to the rear-wheel brakes 5 and 5', if desired.

If, in the shown hydraulic brake system, a failure takes place in the main brake line 4 for the front-wheel brakes 3 and 3', the auxiliary brake line 4' is effective to pass the pressurized fluid from the master cylinder 1 to the front-wheel brakes when the brake pedal 2 is pressed so as to apply brakes in proper conditions in spite of the failure in the main brake line. The disc brake implementing this invention is used specifically in the hydraulic brake system of this type.

Figure 2:
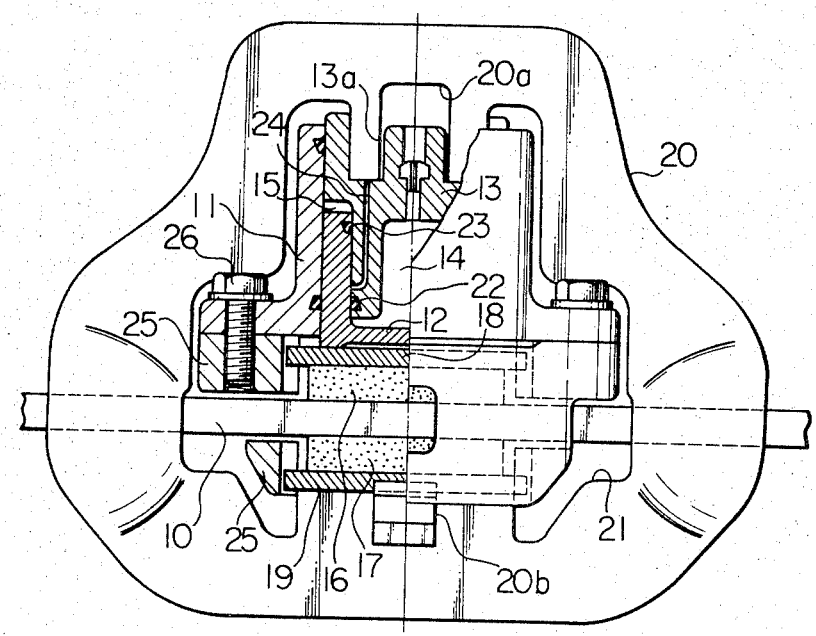
FIG. 2 is a view showing, in section in the left half and in plan in the right half, a preferred embodiment of the disc brake according to this invention.

A preferred embodiment of such disc brake is now shown in FIG. 2.

The disc brake of FIG. 2 includes a rotatable braking disc 10 which is mounted to rotate with a vehicle wheel (not shown) and a stationary cylinder 11 which is fixed relative to the vehicle wheel and located adjacent to one side of the braking disc 10. The stationary cylinder 11 is open at both ends and has its axis substantially parallel to the axis of the braking disc 10. Inner and outer pistons 12 and 13, respectively, are axially slidably fitted into the cylinder bore of the stationary cylinder 11. A main fluid chamber 14 is defined between the cavity of the outer piston 13 and the opposite wall of the inner piston 12 and communicates with the main front brake line 4 of the brake system shown in FIG. 1. An auxiliary fluid chamber 15 is defined between an outer peripheral edge of the inner piston 12 and inner peripheral edge of a stepped section of the outer piston 13 and communicates with the auxiliary front brake line 4' of the brake system of FIG. 1. The inner and outer pistons 12 and 13, respectively, are thus urged apart from each other when the fluid under pressure from the master cylinder 1 is admitted to the main and auxiliary fluid chambers 14 and 15 through the front brake lines 4 and 4', respectively.

Positioned adjacent to either side of the braking disc 10 are inner and outer friction pads 16 and 17, respectively. The friction pads 16 and 17 are bonded or otherwise secured to respective backing plates 18 and 19 which are substantially coextensive with the associated friction pads. The friction pad assembly thus comprising the inner friction pad 16 and the backing plate 18 is interposed between the braking disc 10 and the stationary cylinder 11 so that the inner piston 12 is in abutting engagement with the backing plate 18 of the pad assembly. The friction pad assembly which is made up of the outer friction pad 17 and the backing plate 19, on the other hand, is positioned adjacent the opposite side of the braking disc 10, as shown.

The stationary cylinder 11, pistons 12 and 13 and the friction pad assemblies are encased in a yoke 20 fitting over the braking disc 10 and having an opening 21 which is adapted to admit the relative movements of the movable members. The yoke 20 is movable relative to the stationary cylinder 11 in a direction parallel to the axis of the braking disc 10. Such movement of the yoke 20 is effected by the movement in this direction of the outer piston 13 with which the yoke 20 is interlocked. The movement of the yoke 20 is carried to the backing plate 19 for the outer friction pad 17 through a suitable mechanical linkage (not shown) with the result that the outer pad assembly is moved toward the braking disc 10 in accordance with the movement of the yoke 20. This mechanical linkage is shown to include an inner edge 20a formed in the yoke 20 to face an extension 13a of the outer piston 13 and a retainer member 20b which is integral with the yoke 20 and connected to the backing plate 19 of the outer friction pad assembly. The outer piston 13 bears at its extension 13a against the inner edge 20a when moved away from the braking disc 10 and moves the yoke 20 in the same direction so that the outer friction pad assembly is moved accordingly toward the braking disc 10.

When the fluid under pressure is admitted into the main and auxiliary fluid chambers 14 and 15, respectively, the inner piston 12 is moved toward the braking disc 10 and the outer piston 13 and accordingly the yoke 20 are moved in the opposite direction, causing the friction pads 16 and 17 to press upon the braking disc 10 for applying the brake to the associated wheel.

According to this invention, now, inner and outer spaced sealing rings 22 and 23, respectively, are mounted between the inner peripheral surface of the inner piston 12 and the outer peripheral surface of the outer piston 13, one of the sealing rings being positioned adjacent the outermost end of the inner piston 12 and the other adjacent the innermost end of the outer piston 13, as illustrated. The sealing rings 22 and 23 are herein shown as embedded in the walls of the outer and inner pistons 13 and 12, respectively, through annular grooves formed therein but the same may be mounted on any of the inner and outer pistons.

A drain passage 24 is provided which originates at a substantial junction between the peripheral walls of the pistons 12 and 13 and between the inner and outer sealing rings 22 and 23, respectively. The drain passage 24 is led out of the brake assembly in a suitable manner; in the illustrated construction, the drain passage 24 is shown to extend internally of the peripheral wall of the outer piston 13 by way of example.

When, now, either of the two sealing rings, say the inner sealing ring 22 for instance, happens to fail during operation, the pressurized fluid drawn into the main fluid chamber 14 is permitted to escape outwardly through the drain passage 24. Because, however, the auxiliary fluid chamber 15 is kept isolated by means of the remaining sealing ring 23, the fluid under pressure in chamber 15 acts satisfactorily upon the inner and outer pistons 12 and 13, respectively so that the braking disc 10 can be gripped by the friction pads 16 and 17. Drainage of the fluid from the main fluid chamber 14, on the other hand, results in a decrease in the fluid level in the master cylinder reservoir so as to provide an indication, any form, of the failure of the sealing ring 22 to the driver of the motor vehicle, permitting him to replace the defective sealing ring with a new one at the appropriate time.

Figure 3:
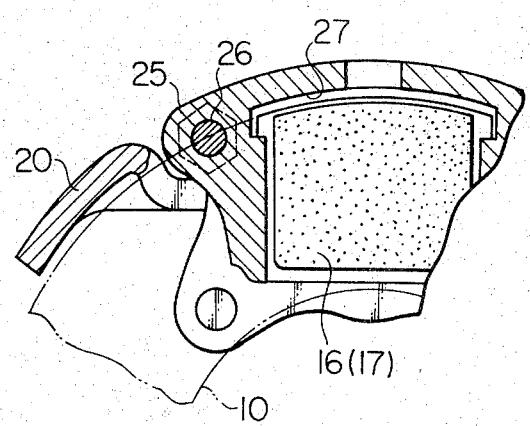
FIG. 3 is a plan view showing, partly in section, a portion of the disc brake shown in FIG. 2.

The braking torque imparted to the friction pads 16 and 17 is usually taken by the yoke 20 which, in turn, transfers the torque to the stationary cylinder 11. It is, however, desired for streamlining the braking operation that the yoke 20 be cleared of a duty of taking the braking torque so as to only serve the purpose of moving the outer friction pad 17 relative to the braking disc 10. To this end, a support structure 25 is mounted securely on the stationary cylinder 11 by suitable fastening means such as a bolt 26. The support structure 25 has formed therein an opening 27 in which the friction pads 16 and 17 are loosely fitted as best seen in FIG. 3. The braking torque applied to the friction pads 16 and 17 gripping the braking disc 10 is, in this manner, carried to the stationary cylinder through the support structure 25 and, as a consequence, the yoke 20 is permitted to lend itself to only moving the outer friction pad 17. The support structure also has a lengthwise opening which is adapted to accommodate therein the rotation of the braking disc 10.

Figure 4:
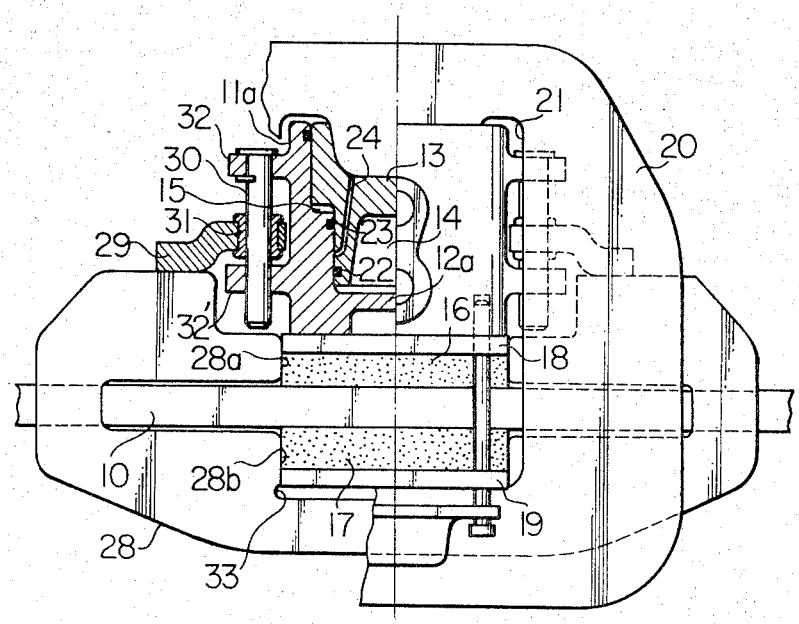
FIG. 4 is similar to FIG. 2 but illustrates another preferred embodiment of the disc brake according to this invention.

A modification of the disc brake according to this invention is illustrated in FIG. 4. The modified disc brake is essentially similar in construction to the disc brake of FIG. 3 except for the arrangement of the inner piston and the stationary cylinder, so that like reference numerals are allocated to corresponding members.

In the modified disc brake shown in FIG. 4, the cylinder 11a is integral with the inner piston 12a and is consequently movable in an axial direction together with the inner piston 12a, contrary to the arrangement of FIG. 3 in which the cylinder 11 is held stationary. The assembly of the movable cylinder 11a and the inner piston 12a is supported and guided by means of a structure which includes a stationary support member 28 having an arm 29 secured thereto and a guide pin 30 fast on the assembly of the cylinder 11a and inner piston 12a. The arm 29 of the support member 28 has an aperture (not numbered) formed adjacent its free end portion and a rubber bushing 31 through which the guide pin 30 is axially moved. The guide pin 30 is mounted secured to the assembly of the cylinder 11a and inner piston 12a in any desired manner and herein shown as fixed thereon through limbs 32 and 32' extending from the cylinder 11a. The stationary support member 28 has a recess 33 so formed as to admit the rotation of the braking disc 10 and to house the inner and outer friction pad assemblies therein. The braking torque which is carried to the friction pads 16 and 17 when the friction pads are forced against the braking disc 10 is thus taken by the stationary support member 28 through inner edges 28a and 28b of the support structure 28 defining the recess 33, as illustrated, whereby the yoke 20 is isolated from the braking torque and permitted to solely act as means to transfer the movement of the outer piston 13 to the outer friction pad assembly during braking operation.

What is claimed is:

1. A disc brake for use in a motor vehicle hydraulic brake system having main and auxiliary brake lines through which pressurized fluid is supplied to said disc brake, which disc brake comprises, in combination:
   1. a rotatable braking disc mounted to rotate with a vehicle wheel;
   2. a hydraulic cylinder positioned adjacent to one side of said braking disc and movable in opposite directions which are substantially parallel to an axis of said braking disc;
   3. a piston axially slidably fitting in said cylinder, said piston and said cylinder defining therebetween main and auxiliary fluid chambers into which said pressurized fluid is drawn when a braking action is to be initiated, said main and auxiliary fluid chambers communicating with said main and auxiliary brake lines respectively;
   4. inner and outer friction pad assemblies respectively positioned adjacent to either side of said braking disc and forced against opposite sides of said braking disc when said piston and said cylinder are moved by means of said pressurized fluid, said inner friction pad assembly being interposed between said braking disc and said cylinder;
   5. a yoke fitting over said braking disc and movable with said piston in the opposite directions which are substantially parallel to the axis of said braking disc, said yoke mechanically connecting said piston and said outer friction pad assembly for carrying the movement of the former to the latter;
   6. a pair of spaced sealing means mounted between peripheral walls of said piston and said cylinder for isolating said main and auxiliary fluid chambers from each other;
   7. a drain passage leading from a junction between said peripheral walls of said piston and said cylinder and between said spaced sealing means to the outside of said disc brake for permitting said pressurized fluid to be released through said drain passage when at least either of said sealing means fails; and
   8. a support structure connected with said cylinder and including a stationary support member, an arm secured thereto and having formed adjacent its free end portion an aperture and a guide pin which is secured to said cylinder and which is axially movably inserted into said aperture, said stationary support member having a recess formed to admit the rotation of said braking disc and to house said inner and outer friction pad assemblies therein.

2. A disc brake according to claim 1, in which further comprises a guide pin being passed through aperture formed in backing plates of said friction pad assemblies for guiding said friction pad assemblies when said friction pad assemblies are moved toward and away from said braking disc.

3. A disc brake according to claim 1, in which said support structure comprises rubber bushings, each of which is secured in said aperture in said arm.

4. A disc brake for use in a motor vehicle hydraulic brake system having main and auxiliary brake lines through which pressurized fluid is supplied to said disc brake, which disc brake comprises, in combination:
   1. a rotatable braking disc mounted to rotate with a vehicle wheel;
   2. a hydraulic cylinder being open at both ends and positioned adjacent to one side of said braking disc with its axis substantially parallel to an axis of said braking disc;
   3. inner and outer pistons slidable in said cylinder in opposite directions which are substantially parallel to the axis of said braking disc and including enterengaged walls, said pistons defining therebetween main and auxiliary fluid chambers into which said pressurized fluid is drawn when a braking action is to be initiated, said main and auxiliary fluid chambers communicating with said main and auxiliary brake lines respectively;
   4. inner and outer friction pad assemblies respectively positioned adjacent to either side of said braking disc and forced against opposite sides of said braking disc when said pistons are moved by means of said pressurized fluid, said inner friction pad assembly being interposed between said braking disc and said hydraulic cylinder;
   5. a yoke fitting over said braking disc and movable with said outer piston in the opposite direction which is substantially parallel to the axis of said braking disc, said yoke mechanically connecting said outer piston and said outer friction pad assembly for carrying the movement of the former to the latter;
   6. a pair of spaced sealing means mounted between the enterengaged peripheral portions of said walls for isolating said main and auxiliary fluid chambers from each other;
   7. a drain passage leading from a junction between said peripheral walls of said pistons and between said spaced sealing means to the outside of said disc brake for permitting said pressurized fluid to be released through said drain passage when at least either of said sealing means fails; and
   8. a support structure connected with said cylinder and having formed therein an opening in which said inner and outer friction pad assemblies loosely fit for transferring a braking torque from said friction pad assemblies to said support structure.

5. A disc brake according to claim 4, in which said hydraulic cylinder is held stationary relative to said vehicle wheel.

6. A disc brake according to claim 4, in which said drain passage is formed internally of the peripheral wall of said outer piston.

7. A disc brake according to claim 4, in which said drain passage is formed internally of the peripheral wall of said inner piston.

8. A disc brake according to claim 4, in which said yoke is connected with said outer piston by means of a mechanical linkage including an inner edge formed in said yoke to face an extension of said outer piston and connected with said outer friction pad assembly by means of a retainer member which is integral with said yoke.

* * * * *